United States Patent
Chang

(10) Patent No.: US 11,600,098 B2
(45) Date of Patent: Mar. 7, 2023

(54) APPARATUS AND METHOD FOR FINGERPRINT IMAGING

(71) Applicant: SHANGHAI HARVEST INTELLIGENCE TECHNOLOGY CO., LTD., Shanghai (CN)

(72) Inventor: Lee Ya-Ti Chang, Shanghai (CN)

(73) Assignee: SHANGHAI HARVEST INTELLIGENCE TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/316,890

(22) Filed: May 11, 2021

(65) Prior Publication Data

US 2021/0350106 A1 Nov. 11, 2021

(30) Foreign Application Priority Data

May 11, 2020 (CN) .......................... 202010396107.8
May 11, 2020 (CN) .......................... 202010396108.2

(51) Int. Cl.
*G06V 40/13* (2022.01)
*G06V 40/12* (2022.01)

(52) U.S. Cl.
CPC ...... *G06V 40/1318* (2022.01); *G06V 40/1359* (2022.01)

(58) Field of Classification Search
None
See application file for complete search history.

(56) References Cited

U.S. PATENT DOCUMENTS

2017/0228579 A1* 8/2017 Zhu .................. H01L 25/167
2020/0349335 A1* 11/2020 Cheng .................. G06V 10/145

* cited by examiner

*Primary Examiner* — Joseph R Haley
(74) *Attorney, Agent, or Firm* — Thomas | Horstemeyer, LLP

(57) ABSTRACT

The present disclosure provides an apparatus and a method for fingerprint imaging. The apparatus includes: a light source configured to generate light, wherein a light intensity distribution of the light generated by the light source conforms to a preset encoding mode; a sensing surface on which the light generated by the light source forms a signal light with fingerprint information; and an imaging module configured to image the signal light to obtain a fingerprint image. Embodiments of the present disclosure can encode the fingerprint image by the encoding mode and can "encrypt" the fingerprint image by the encoding mode, thus a clear fingerprint image can be obtained by decoding based on obtaining the preset encoding mode, which can effectively improve the security of fingerprint imaging.

16 Claims, 6 Drawing Sheets

APPARATUS AND METHOD FOR FINGERPRINT IMAGING

CROSS-REFERENCE TO RELATED APPLICATIONS

The present application claims the benefit of priority to Chinese patent application No. 202010396108.2, filed on May 11, 2020, entitled "Apparatus and Method for Fingerprint Imaging," the entire disclosure of which is hereby incorporated herein by reference. The present application also claims the benefit of priority to Chinese patent application No. 202010396107.8, filed on May 11, 2020, entitled "Apparatus and Method for Fingerprint Imaging," the entire disclosure of which is hereby incorporated herein by reference.

TECHNICAL FIELD

The present disclosure relates to the technical field of fingerprint imaging, and more particularly to an apparatus and a method for fingerprint imaging.

BACKGROUND

Fingerprint identification technology collects a fingerprint image of a human being through a fingerprint imaging apparatus, and then compares it with fingerprint information stored in a fingerprint identification system to realize identity identification. Due to convenience of use and uniqueness of human fingerprint, the fingerprint identification technology has been widely used in various fields, such as Public Security Bureaus, customs and other security inspection fields, building access control systems, personal computers and mobile phones and other consumer product fields.

In existing fingerprint imaging apparatuses used in the fingerprint identification technology, one kind is to collect human fingerprint images by an optical method. After a finger presses on a sensing surface, light generated by a light source is projected onto the sensing surface, and then the light is reflected and refracted to form a signal light carrying fingerprint information. The reflected light is collected by an optical image sensor, and then a fingerprint image is obtained.

Fingerprint imaging apparatuses are increasingly used in mobile devices such as laptop computers, tablet computers, and mobile phones to achieve automatic unlocking and function of related mobile devices. Especially, a fingerprint identification in mobile phones is widely used.

However, the wide application of fingerprint imaging apparatuses puts forward higher and higher requirements for security.

SUMMARY

Embodiments of the present disclosure provide an apparatus and a method for imaging a fingerprint, which can improve security.

An embodiment of the present disclosure provides an apparatus for imaging a fingerprint. The apparatus includes: a light source configured to generate light, wherein a light intensity distribution of the light generated by the light source conforms to a preset encoding mode; a sensing surface on which the light generated by the light source forms a signal light with fingerprint information; and an imaging module configured to image the signal light to obtain a fingerprint image.

In some embodiment, the preset encoding mode includes a distribution code or a light source code. The distribution code includes at least one distribution pattern, and the light source code includes at least one light source pattern.

In some embodiment, the light source includes a plurality of display modules, and each of the plurality of display modules is configured to generate light with a light intensity distribution having a distribution pattern.

In some embodiment, the plurality of display modules are configured to generate light having different distribution patterns simultaneously.

In some embodiment, adjacent display modules are configured to generate light having different distribution patterns.

In some embodiment, the light source includes one or more display modules, and each of the one or more display modules is configured to sequentially generate light having a plurality of distribution patterns within a preset imaging time period.

In some embodiment, the display modules are configured to sequentially generate light having different distribution patterns.

In some embodiment, the distribution pattern is at least selected from a group including Lambertian distribution, Batwing distribution and Side-light emitting distribution.

In some embodiment, the imaging module is configured to image the signal light to obtain an initial fingerprint image, and the apparatus further includes a processing module configured to obtain a processed fingerprint image based on the distribution code and the initial fingerprint image.

In some embodiment, the processing module includes a function circuitry, an encoding circuitry, and a calculating circuitry. The function circuitry is configured to obtain a point spread function corresponding to the distribution pattern according to the distribution pattern, the encoding circuitry is configured to obtain a point spread function corresponding to the distribution code based on the point spread function corresponding to the distribution pattern, and the calculating circuitry is configured to obtain the processed fingerprint image according to the point spread function corresponding to the distribution code and the initial fingerprint image.

In some embodiment, the encoding circuitry obtains the point spread function corresponding to the distribution code based on a linear combination of point spread functions corresponding to distribution patterns.

In some embodiment, among the light generated by the light source, at least the light having an emergent angle within a range from 40 degrees to 60 degrees has the light intensity distribution conforming to the distribution code.

In some embodiment, the light source includes a plurality of display modules, and the plurality of display modules are configured to simultaneously display the light source pattern.

In some embodiment, the plurality of display modules are configured to display different light source patterns simultaneously.

In some embodiment, adjacent display modules are configured to display different light source patterns.

In some embodiment, the light source includes one or more display modules, and each of the one or more display modules is configured to sequentially display a plurality of light source patterns.

In some embodiment, each of the one or more display modules is configured to sequentially display different light source patterns.

In some embodiment, a spatial period of a bright-dark alternation of the light source pattern corresponds to a spatial period of a ridge-valley alternation of the fingerprint.

In some embodiment, the light source pattern is at least selected from a group including a plus sign shape pattern, a minus sign shape pattern, an X-shaped pattern, a Z-shaped pattern, an M-shaped pattern, an L-shaped pattern and a Y-shaped pattern.

In some embodiment, the imaging module is configured to image the signal light to obtain an initial fingerprint image, and the apparatus further includes a processing module configured to obtain a processed fingerprint image based on the light source code and the initial fingerprint image.

In some embodiment, the processing module includes a function circuitry, an encoding circuitry, and a calculating circuitry. the function circuitry is configured to obtain a point spread function corresponding to the light source pattern according to the light source pattern, and the encoding circuitry is configured to obtain a point spread function corresponding to the light source code based on the point spread function corresponding to the light source pattern, and the calculating circuitry is configured to obtain the processed fingerprint image according to the point spread function corresponding to the light source code and the initial fingerprint image.

In some embodiment, the encoding circuitry obtains the point spread function corresponding to the light source code based on a linear combination of point spread functions corresponding to the light source patterns.

In some embodiment, the processing module is further pre-stored with the light source code to control the light source to display the light source pattern.

In some embodiment, the light source includes an OLED display or OLED display pixels.

In some embodiment, the apparatus for imaging the fingerprint includes an under-screen or in-screen fingerprint imaging apparatus.

Another embodiment of the present disclosure provides method for imaging a fingerprint. The method includes: generating light with a light intensity distribution conforming to a preset encoding mode, forming a signal light with fingerprint information by the generated light on a sensing surface; and imaging the signal light.

In some embodiment, the encoding mode includes a distribution code or a light source code. The distribution code includes at least one distribution pattern, and the light source code includes at least one light source pattern.

In some embodiment, during generating light, the generated light has one or more distribution patterns.

In some embodiment, during generating light, the generated light has a plurality of different distribution patterns.

In some embodiment, during generating light, adjacent generated light has different distribution patterns.

In some embodiment, during generating light, the generated light sequentially has a plurality of light source patterns within a preset imaging time period.

In some embodiment, the generated light sequentially has different light source patterns.

In some embodiment, the distribution pattern is at least selected from a group including Lambertian distribution, Batwing distribution and Side-light emitting distribution.

In some embodiment, imaging the signal light includes: imaging the signal light to obtain an initial fingerprint image, and the method further includes: obtaining a processed fingerprint image based on the distribution code and the initial fingerprint image after imaging the signal light to obtain the initial fingerprint image.

In some embodiment, obtaining a processed fingerprint image include: obtaining a point spread function corresponding to the distribution pattern according to the distribution pattern; obtaining a point spread function corresponding to the distribution code based on the point spread function corresponding to the distribution pattern; and obtaining the processed fingerprint image according to the point spread function corresponding to the distribution code and the initial fingerprint image.

In some embodiment, obtaining a point spread function corresponding to the distribution code includes obtaining the point spread function corresponding to the distribution code based on a linear combination of point spread function corresponding to distribution patterns.

In some embodiment, during generating light, at least the light having an emergent angle within a range from 40 degrees to 60 degrees has the light intensity distribution conforming to the distribution code.

In some embodiment, the method further includes: displaying the light source pattern according to a preset light source code. In some embodiment, a plurality of light source patterns are displayed simultaneously.

In some embodiment, a plurality of different light source patterns are displayed simultaneously.

In some embodiment, two adjacent light source patterns are different.

In some embodiment, the plurality of light source patterns are sequentially displayed within a preset imaging time period.

In some embodiment, the plurality of different light source patterns are sequentially displayed.

In some embodiment, a spatial period of a bright-dark alternation of the light source pattern corresponds to a spatial period of a ridge-valley alternation of the fingerprint.

In some embodiment, the light source pattern is at least selected from a group including a plus sign shape pattern, a minus sign shape pattern, an X-shaped pattern, a Z-shaped pattern, an M-shaped pattern, an L-shaped pattern and a Y-shaped pattern. The plus sign shape pattern is "+", and the minus sign shape is "−".

In some embodiment, imaging the signal light includes: imaging the signal light to obtain an initial fingerprint image, and the method further includes: obtaining a processed fingerprint image based on the light source code and the initial fingerprint image after imaging the signal light to obtain the initial fingerprint image.

In some embodiment, obtaining a processed fingerprint image include: obtaining a point spread function corresponding to the light source pattern according to the light source pattern; obtaining a point spread function corresponding to the light source code based on the point spread function corresponding to the light source pattern; and obtaining the processed fingerprint image according to the point spread function corresponding to the light source code and the initial fingerprint image.

In some embodiment, obtaining a point spread function corresponding to the light source code includes: obtaining the point spread function corresponding to the light source code based on a linear combination of point spread functions corresponding to light source patterns.

In some embodiment, generating light includes generating light by an OLED display screen or OLED display pixels.

In some embodiment, the method is applied to an under-screen or in-screen fingerprint imaging apparatus.

Compared with conventional technologies, embodiments of the present disclosure have following beneficial effects.

In the apparatus and method for imaging a fingerprint, the light intensity distribution of the generated light conforms to the preset encoding mode, and the light intensity distribution of the generated light affects an imaging result of the signal light, thus a clear fingerprint image can be obtained only by obtaining an accurate encoding mode. That is, the apparatus and method of the present disclosure can encode fingerprint imaging by the encoding code, and can "encrypt" the fingerprint image by the encoding code, thus the clear fingerprint image can be obtained by decoding based on obtaining the preset encoding mode. Therefore, the apparatus and method of the present disclosure can effectively improve the security of fingerprint imaging.

In some embodiment of the present disclosure, the light source includes a plurality of display modules, and each of the plurality of display modules generates light with the light intensity distribution having a distribution pattern. That is, when there are multiple distribution patterns, the plurality of display modules can simultaneously generate light having multiple distribution patterns; or, within a preset imaging time period, the display modules sequentially generates light with multiple distribution patterns. By increasing the number of the distribution patterns in the distribution code, the complexity of the distribution code can be effectively increased, which facilitates to further improve the security of fingerprint imaging of the apparatus.

In some embodiment of the present disclosure, the plurality of display modules simultaneously generate light having different distribution patterns; or, the plurality of display modules sequentially generate light having multiple different distribution patterns, thereby effectively increasing the complexity of the distribution code, which facilitates to improve the security of fingerprint imaging and increase the application of the apparatus.

In some embodiment of the present disclosure, the light source includes an OLED display screen or OLED display pixels, and the apparatus for fingerprint imaging may be an under-screen or in-screen fingerprint imaging apparatus. Therefore, no additional configuration is required to ensure a screen-to-body ratio and to achieve the function of displaying the distribution patterns by the light source. Moreover, the security of fingerprint imaging can be effectively improved without increasing the size and details of the fingerprint image.

In some embodiment of the present disclosure, among the light generated by the light source, at least the light having an emergent angle within a range from 40 degrees to 60 degrees has the light intensity distribution conforming to the distribution code, which can ensure a smooth collection of fingerprint images, and also suppress noises to obtain a higher signal-to-noise ratio. Moreover, when the light source is an OLED display screen, a large viewing angle can also be achieved, thereby further improving the use experience.

In some embodiment of the present disclosure, the light source code includes one or more light source patterns, and the light source includes a plurality of display modules, and each of the plurality of display modules display a light source pattern. That is, when there are multiple light source patterns, the plurality of display modules can display multiple light source patterns simultaneously; or, within a preset imaging time period, the plurality of display modules can display multiple light source patterns sequentially. That is, the multiple light source patterns can be displayed in sequence. By increasing the number of the light source patterns in the light source code, the complexity of the light source code can be effectively increased, which further improves the security of fingerprint imaging of the apparatus.

In some embodiment of the present disclosure, the plurality of display modules respectively display different light source patterns, that is, multiple different light source patterns can be displayed at the same time; or, the plurality of display modules can display multiple different light source patterns sequentially. The display of multiple different light source patterns can effectively increase the complexity of the light source code, which can improve the security of fingerprint imaging, and facilitate a wide application of the apparatus for fingerprint imaging.

In some embodiment of the present disclosure, a spatial period of a bright-dark alternation of the light source pattern corresponds to a spatial period of a fingerprint. That is, the spatial period of the bright-dark alternation of the light source pattern is adapted to the spatial period of a ridge-valley alternation of a fingerprint, which can enhance the influence of the light source pattern on the imaging result of the signal light, and effectively improve the security of fingerprint imaging.

In some embodiment of the present disclosure, the light source includes an OLED display screen, and the apparatus for fingerprint imaging may be an under-screen fingerprint imaging apparatus. Therefore, no additional configuration is required to ensure a screen-to-body ratio and to achieve the function of displaying the distribution patterns by the light source. Moreover, the security of fingerprint imaging can be effectively improved without increasing the size and details of the fingerprint image.

DETAILED DESCRIPTION

As mentioned in the background, the security of existing fingerprint imaging apparatus needs to be improved.

The light source in the existing fingerprint imaging apparatus is usually a uniform light source (surface light source or line light source), or point light source. A point spread function of an optical system in the fingerprint imaging apparatus is generally relatively simple. After imaging of signal light, a fingerprint image can be obtained according to a point spread function of corresponding uniform light source or point light source. The point spread function of the uniform light source or the point light source is well known, which affects the security of the fingerprint imaging apparatus.

On the other hand, in the existing technology, the security of the fingerprint imaging apparatus is often improved by increasing an area of the fingerprint imaging apparatus. However, this method often increases an area of the fingerprint imaging apparatus and affects an application environment of the fingerprint imaging apparatus, especially when the fingerprint imaging apparatus is configured with the display screen, a screen proportion of the device and the use experience of an electronic device is affected.

An embodiment of the present disclosure provides an apparatus for imaging a fingerprint. The apparatus includes: a light source configured to generate light, wherein a light intensity distribution of the light generated by the light source conforms to a preset encoding mode; a sensing surface on which the light generated by the light source forms a signal light with a fingerprint information; and an imaging module configured to image the signal light to obtain a fingerprint image.

Embodiments of the present disclosure can effectively improve the security of imaging the fingerprint, and can realize both security and miniaturization without increasing the area of the apparatus for imaging the fingerprint.

In order to make above objects, features and beneficial effects of the present disclosure more obvious and understandable, specific embodiments of the present disclosure are described in detail in combination with the drawings.

Figure 1:
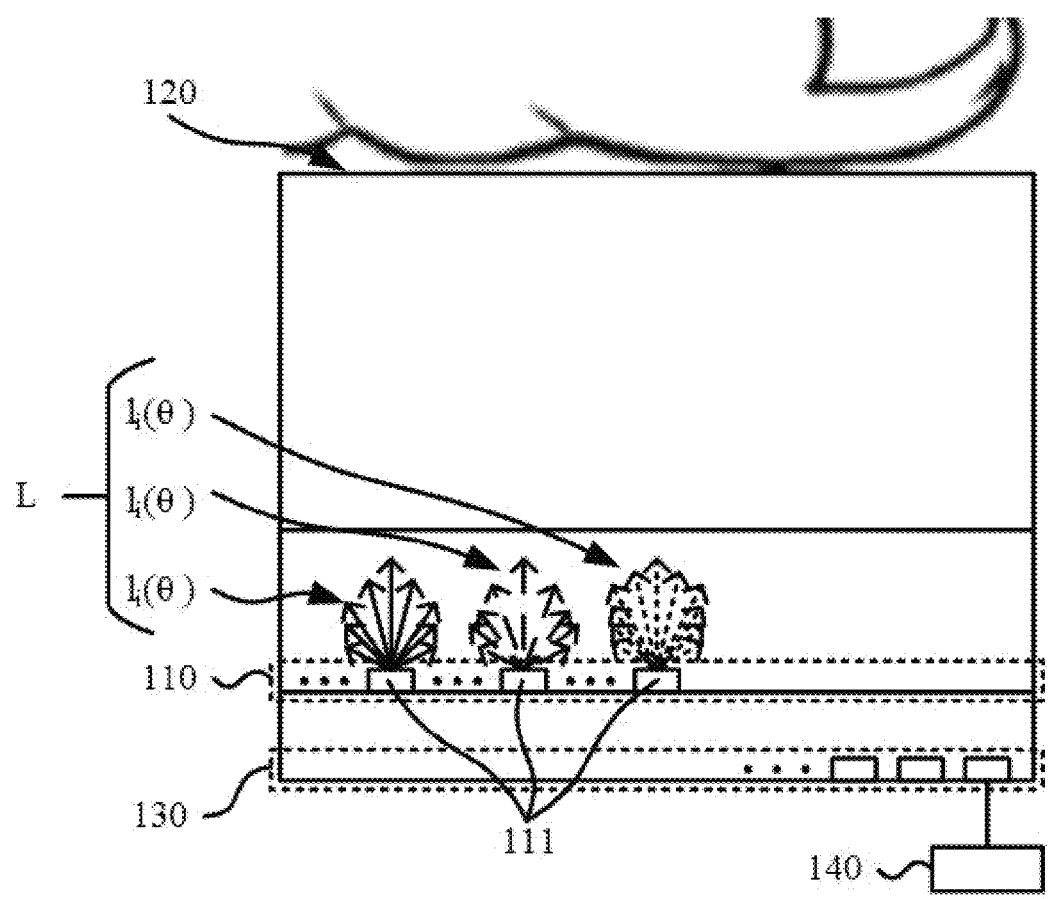
FIG. 1 is a schematic diagram showing a structure of an apparatus for fingerprint imaging according to an embodiment of the present disclosure.

FIG. 1 is a schematic diagram showing a structure of an apparatus for imaging a fingerprint according to an embodiment of the present disclosure.

As shown in FIG. 1, the apparatus includes a light source 110, a sensing surface 120 and an imaging module 130. The light source 110 is configured to generate light, and a light intensity distribution of the light generated by the light source 110 conforms to a preset encoding mode. The light generated by the light source 110 forms signal light with fingerprint information on the sensing surface 120, and the imaging module 130 is configured to image the signal light.

The light intensity distribution of the generated light conforms to the preset encoding mode, and the light intensity distribution of the generated light affects the imaging result of the signal light, thus a clear fingerprint image can be obtained only by obtaining an accurate encoding mode. That is, the apparatus and method of the present disclosure can encode fingerprint imaging by encoding, and can "encrypt" the fingerprint image by encoding, thus the clear fingerprint image can be obtained by decoding based on obtaining the preset encoding mode. Therefore, the apparatus and method of the disclosure can effectively improve the security of fingerprint imaging.

The embodiments of the present disclosure will be described in detail below with reference to the accompanying drawings.

The light source 110 is configured to generate light for fingerprint imaging.

It should be noted that, in some embodiment of the present disclosure, the encoding mode includes a distribution code L, and the distribution code includes at least one distribution pattern $l_i(\theta)$. In other embodiments of the present disclosure, the encoding mode may further include a light source code, and the light source code includes at least one light source pattern.

In some embodiment of the present invention, the light source 110 includes an OLED display screen. The OLED display screen has the advantage of a wide viewing angle, that is, the light source 110 has a wide range of emergent angles, which can effectively improve the display effect and improve the user experience.

Figure 2:
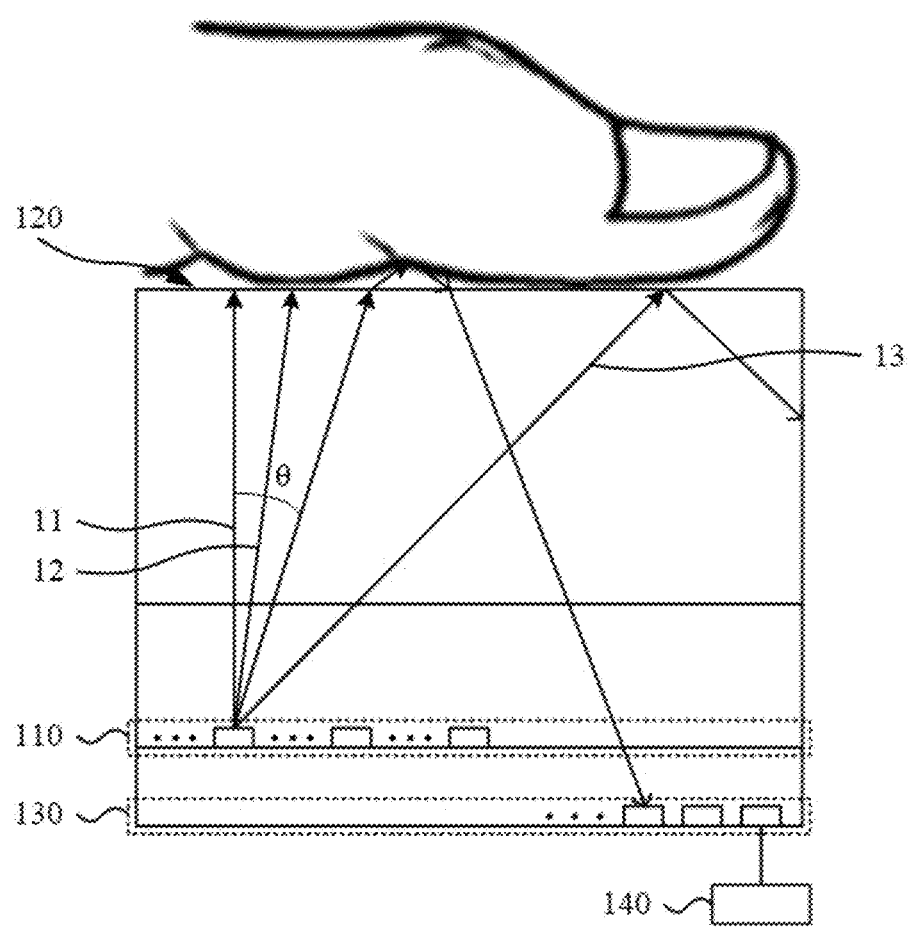
FIG. 2 is a schematic diagram showing an optical structure of the apparatus for fingerprint imaging shown in FIG. 1.

With reference to FIG. 2, an optical structure of the apparatus for imaging the fingerprint is shown.

The light generated by the light source 110 exits at a certain emergent angle θ. Since the light source 110 includes the OLED display screen, the range of the emergent angle θ of the light generated by the light source 110 is wider, and the wider the range of the emergent angle θ of the generated light, the better.

As shown in FIG. 2, among the light generated by the light source 110, light having a small emergent angle θ, for example, light 11 or light 12 as shown in FIG. 2, is projected onto the sensing surface 120, and most of the light is emitted from the sensing surface 120, and seldom reflected, thus the fingerprint image cannot be obtained. Only the light having an emergent angle θ greater than an angle θ, of total reflection can be used to obtain the fingerprint image. The angle $\theta_c$ of total reflection is related to an optical refractive index of a material of both sides of the sensing surface. At an interface between glass and air, a typical angle of total reflection $\theta_c$ may be 42 degrees.

On the other hand, the light having a too large emergent angle θ, for example, light 13 as shown in FIG. 1, is projected on the sensing surface 120 and the reflected light will cause interference to the imaging of the imaging module 130 (for example, the light 13 may form an optical waveguide), which becomes noise and affects the signal-to-noise ratio, thus the obtained fingerprint image is not clear enough.

In some embodiment of the present disclosure, among the light generated by the light source, at least the light intensity distribution of the light having an emergent angle within a range from 40 degrees to 60 degrees conforms to the distribution code, which can not only ensure a smooth collection of fingerprint images, but also suppress noises, and obtain a higher signal-to-noise ratio. Moreover, when the light source is an OLED display screen, a large viewing angle can also be obtained, thereby further improving the use experience.

Furthermore, the apparatus for imaging the fingerprint may be an under-screen fingerprint imaging apparatus, that is, the imaging module 130 of the apparatus for imaging the fingerprint is disposed directly below the OLED display screen. By configuring the apparatus for imaging the fingerprint as the under-screen fingerprint imaging apparatus, it is possible to further increase the screen proportion and effectively improve the use experience.

As shown in FIG. 1 and FIG. 2, in some embodiment of the present disclosure, the light source 110 includes a plurality of display modules 111, and each display module 111 generates light with a light intensity distribution having a distribution pattern. That is, each display module 111 generates light having an independent distribution pattern, that is, the light intensity distribution of the light generated by each display module 111 conforms to a distribution pattern $l_i(\theta)$. The light intensity distributions of the light generated by all the display modules 111 form the distribution code L.

In some embodiments, the light source 110 includes a plurality of discrete display modules 111. The plurality of discrete display modules 111 may have the same or different intervals, and the plurality of discrete display modules 111 may be a plurality of display areas in the light source 110.

Specifically, the plurality of display modules 111 simultaneously generate light having different distribution patterns $l_i(\theta)$, thereby effectively increasing the complexity of the distribution code L and the complexity of the distribution patterns $l_i(\theta)$ in the distribution code L, which can effectively improve the security of fingerprint imaging of the apparatus for imaging the fingerprint.

It should be noted that in other embodiments of the present disclosure, the plurality of display modules may also simultaneously generate light having a same distribution pattern $l_i(\theta)$. In other embodiments of the present disclosure, some of the plurality of display modules may simultaneously generate light having a same distribution pattern $l_i(\theta)$. Whether the plurality of display modules simultaneously generate light having the same or different distribution patterns $l_i(\theta)$ is not limited herein.

In addition, the distribution patterns $l_i(\theta)$ of the light generated by adjacent display modules 111 on a position are different, thereby increasing the complexity of the distribution patterns $l_i(\theta)$ and improving the security of the apparatus for imaging the fingerprint.

In some embodiment of the present disclosure, in order to further increase the complexity of the distribution patterns $l_i(\theta)$ in the distribution code L and improve the security of the apparatus for imaging the fingerprint, the display modules 111 may sequentially generate light having multiple distribution patterns $l_i(\theta)$ within a preset imaging time period.

Specifically, adjacent display modules 111 in a time sequence may generate light having different distribution patterns $l_i(\theta)$, thereby increasing the complexity of the distribution patterns $l_i(\theta)$ and improving the security of the apparatus for imaging the fingerprint.

Specifically, the display modules 111 may sequentially generate light having multiple different distribution patterns $l_i(\theta)$ to further increase the complexity of the distribution patterns $l_i(\theta)$, so as to improve the security of the apparatus for imaging the fingerprint.

On the other hand, the complexity of the distribution pattern $l_i(\theta)$ will affect the complexity of the point spread function corresponding to the distribution pattern, which will affect amount of calculation in the process of capturing the fingerprint image. Therefore, as shown in FIG. 2, in some embodiment of the present disclosure, in order to achieve computational efficiency and safety, the distribution pattern $l_i(\theta)$ is at least selected from a group including Lambertian distribution, Batwing distribution and Side-light emitting distribution. In other embodiments of the present disclosure, the distribution pattern $l_i(\theta)$ is related to a design of the light source, and can also be selected from other light intensity distribution patterns. The present disclosure is not limited to this.

Still referring to FIG. 1, the apparatus further includes the sensing surface 120. The sensing surface 120 is configured to provide a surface to be contacted by a finger. The imaging module 130 images the signal light to obtain an initial fingerprint image. Specifically, the imaging module 130 collects the signal light for imaging and performs photoelectric conversion, thereby obtaining the initial fingerprint image.

In some embodiment, the imaging module 130 may be a photosensor. The photosensor includes a photosensitive pixel array, and each pixel includes a photodiode or a phototransistor.

In some embodiment, the imaging module 130 may include a TFT circuit area and a light detecting thin film transistor area, and the light detecting thin film transistor area is provided with a photosensitive thin film transistor.

In some embodiment, the sensing surface 120 may be a glass surface. Specifically, the apparatus for imaging the fingerprint is an under-screen fingerprint imaging apparatus with an OLED display screen, and the sensing surface 120 is a surface of a cover glass of the OLED display screen.

In an optical system, a point spread function (PSF) describes a response of an imaging system to a point light source. Therefore, a result of a convolution of the point spread function with the fingerprint image is an imaging result of the signal light, that is, the initial fingerprint image, which can be expressed as:

$$y=h*x+n$$

wherein y represents the initial fingerprint image, h represents the point spread function, x represents the fingerprint image, and n represents noise.

In some embodiment, the distribution code L includes a plurality of distribution patterns $l_i(\theta)$. The light source 110 includes a plurality of display modules 111, and each display module 111 generates light with a light intensity distribution having a distribution pattern $l_i(\theta)$. Each distribution pattern $l_i(\theta)$ can obtain a corresponding initial fingerprint image, so a result of a convolution of each distribution pattern $l_i(\theta)$ with the fingerprint image is the corresponding initial fingerprint image corresponding to the distribution pattern $l_i(\theta)$, which can be expressed as:

$$y_i=h[l_i(\theta)]*x+n$$

wherein $y_i$ represents the obtained initial fingerprint image corresponding to the distribution pattern $l_i(\theta)$, $h[l_i(\theta)]$ represents the point spread function corresponding to the distribution pattern $l_i(\theta)$, $l_i(\theta)$ represents the distribution pattern, x represents the fingerprint image, and n represents the noise.

The imaging module 130 images the signal light, so a superposition of initial fingerprint images obtained by all distribution patterns $l_i(\theta)$ is the initial fingerprint image obtained by the imaging module 130, which can be expressed as:

$$Y = \sum_i^N m_i\{h[l_i(\theta)]*x\} + n$$

wherein Y represents the initial fingerprint image obtained by the imaging module 130, represents a weight of the distribution pattern $l_i(\theta)$ in the distribution code L, $h[l_i(\theta)]$ represents the point spread function corresponding to the distribution pattern $l_i(\theta)$, $l_i(\theta)$ represents the distribution pattern, x represents the fingerprint image, and n represents the noise.

Specifically, the point spread function of the distribution code L is obtained according to a linear combination of the point spread functions corresponding to the distribution patterns $l_i(\theta)$, so the initial fingerprint image obtained by the imaging module 130 can be expressed as:

$$Y = h(L)*x = h\left[\sum_i^N m_i l_i(\theta)\right]*x + n$$

wherein h(L) represents the point spread function corresponding to the distribution code L, x represents the fingerprint image, $l_i(\theta)$ represents the distribution pattern, $m_i$ represents the weight of the distribution pattern in the distribution code L, Y represents the initial fingerprint image obtained by the imaging module 130, and n represents the noise.

Therefore, the imaging module 130 images the signal light to obtain the initial fingerprint image. Still referring to FIG. 2, the apparatus for imaging the fingerprint further includes a processing module 140. The processing module 140 is configured to obtain the processed fingerprint image based on the distribution code L and the initial fingerprint image. In some embodiment, the processing module 140 may include a micro-processor, and/or a digital signal processor (DSP), etc.

It should be noted that the distribution code L may be pre-stored in the processing module 140 to control the light source 110, so that the light source 110 can generate light with the distribution code L having at least one distribution pattern $l_i(\theta)$.

Therefore, in some embodiment of the present disclosure, the processing module 140 is coupled with the imaging module 130, and obtains the initial fingerprint image obtained by the imaging module 130 from the imaging module 130. The processing module 140 is also pre-stored with the distribution code L. The processing module 140 obtains the processed fingerprint image according to the distribution code L and the initial fingerprint image.

Figure 3:
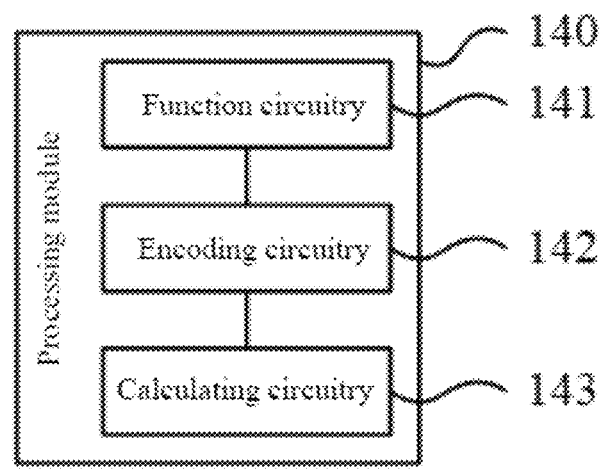
FIG. 3 schematically illustrates a functional block diagram of a processing module 140 in the apparatus for fingerprint imaging shown in FIG. 2.

With reference to FIG. 3, a functional block diagram of the processing module 140 in the apparatus for imaging the fingerprint shown in FIG. 2 is shown.

In some embodiment of the present disclosure, the processing module 140 includes a function circuitry 141, an encoding circuitry 142, or a calculating circuitry 143. The function circuitry 141 is configured to obtain a point spread function corresponding to the distribution pattern $l_i(\theta)$ according to the distribution pattern $l_i(\theta)$. The encoding circuitry 142 is configured to obtain a point spread function corresponding to the distribution code L based on the point spread function corresponding to the distribution pattern $l_i(\theta)$. The calculating circuitry 143 is configured to obtain the processed fingerprint image according to the point spread function corresponding to the distribution code L and the initial fingerprint image.

Specifically, the function circuitry 141 is pre-stored with the distribution code L including the plurality of the distribution patterns $l_i(\theta)$, and the function circuitry 141 obtains the point spread function corresponding to the distribution pattern $l_i(\theta)$ according to the distribution pattern $l_i(\theta)$.

The encoding circuitry 142 is coupled with the function circuitry 141, and can obtain the point spread function corresponding to the distribution pattern $l_i(\theta)$ from the function circuitry 141. The encoding circuitry 142 can obtain the point spread function corresponding to the distribution code L based on the point spread function corresponding to the distribution pattern $l_i(\theta)$.

Specifically, the encoding circuitry 142 can obtain the point spread function corresponding to the distribution code L based on a linear combination of point spread functions corresponding to distribution patterns $l_i(\theta)$.

The calculating circuitry 143 is coupled with the encoding circuitry 142, and can obtain the point spread function corresponding to the distribution code L from the encoding circuitry 142. The calculating circuitry 143 is coupled with the imaging module 130, and can obtain the initial fingerprint image from the imaging module 130. The calculating circuitry 143 can obtain the processed fingerprint image according to the point spread function according to the distribution code L and the initial fingerprint image.

Specifically, the calculating circuitry 143 can obtain the processed fingerprint image through a blind deconvolution calculation on the basis of the initial fingerprint image obtained by the imaging module 130 and the point spread function corresponding to the distribution code L. Specifically, the calculating circuitry 143 performs the blind deconvolution calculation by the method of Eddy's description.

Figure 4:
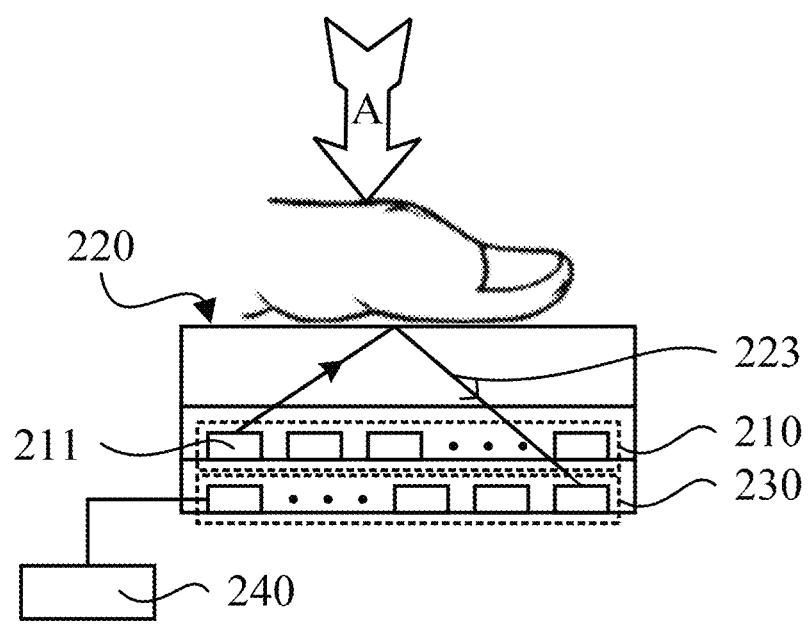
FIG. 4 is a schematic diagram showing a structure of an apparatus for fingerprint imaging according to another embodiment of the present disclosure.

FIG. 4 is a schematic diagram showing a structure of an apparatus for imaging a fingerprint according to another embodiment of the present disclosure.

The difference between this embodiment and the foregoing embodiment is that, in this embodiment, the encoding mode includes a light source code. The light source code includes at least one light source pattern. Specifically, a light source 210 generates light by displaying a light source code including at least one light source pattern to perform fingerprint imaging. Therefore, a shape of the light source pattern in the light source code will affect the imaging result of the signal light, and thus a clear fingerprint image can be obtained by obtaining an accurate light source pattern. That is, the apparatus for imaging the fingerprint of the present disclosure can encode fingerprint imaging through the light source pattern, thereby effectively improving the security of fingerprint imaging, which is beneficial to the wide application of the apparatus for imaging the fingerprint.

Moreover, the apparatus for imaging the fingerprint can improve the security of the fingerprint image without increasing the area of the fingerprint image, so there is no need to change the structure and process of existing imaging module, and safety, miniaturization and low cost can be achieved at the same time.

The following describes the embodiment of the present disclosure in detail with reference to the accompanying drawings.

The light source 210 is configured to generate light for fingerprint imaging.

In some embodiment, the light source 210 includes an OLED display screen. The apparatus for imaging the fingerprint may be an under-screen fingerprint imaging apparatus, that is, an imaging module 130 of the apparatus for imaging the fingerprint is disposed directly below the OLED display screen. By using the under-screen fingerprint imaging apparatus, it can not only ensure a large screen-to-body ratio, but also realize the fingerprint imaging function, which can effectively improve the user experience.

Figure 5:
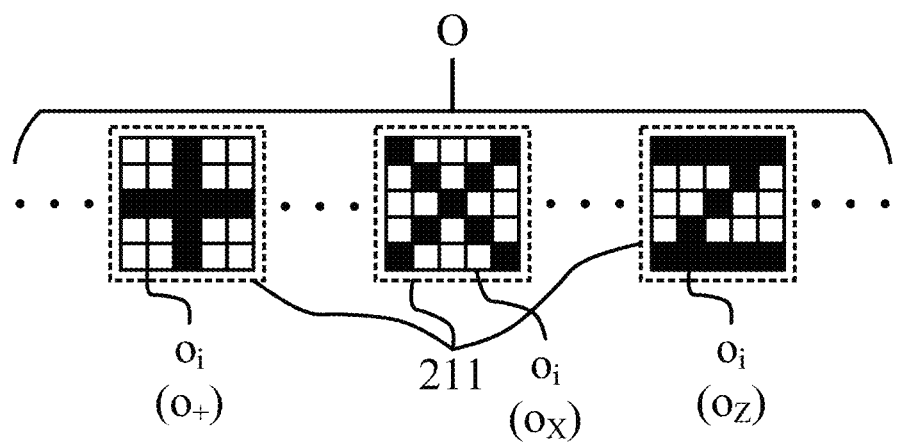
FIG. 5 is a schematic diagram showing a top view of a light source 110 along a direction A in the apparatus for fingerprint imaging shown in FIG. 4.

FIG. 5 is a schematic diagram showing a top view of the light source 110 along a direction A in the apparatus for imaging the fingerprint shown in FIG. 4.

In some embodiment, a light source code O includes one or more light source patterns $O_i$. Therefore, as shown in FIG. 5, the light source 210 includes a plurality of display modules 211, and the plurality of display modules 211 can simultaneously display the light source patterns $O_i$, that is, each display module 211 can independently display the light source patterns $O_i$. In other words, each display module displays a light source pattern $O_i$, and the light source patterns $O_i$ displayed by all display modules constitute the light source code O of the apparatus for imaging the fingerprint.

In some embodiment, the light source 210 includes a plurality of discrete display modules 211. The plurality of discrete display modules 211 may have the same or different intervals, and the plurality of discrete display modules 211 may be a plurality of display areas in the light source 210.

Specifically, the plurality of display modules 211 can simultaneously display different light source patterns $O_i$, so that the complexity of the light source code O can be effectively increased, and the complexity of the light source pattern $O_i$ in the light source code O can be effectively increased. Therefore, the security of fingerprint images obtained by the apparatus for imaging the fingerprint can be effectively improved.

It should be noted that in other embodiments of the present disclosure, the plurality of display modules may also display the same light source pattern at the same time. In other embodiments of the present disclosure, some of the plurality of display module may display the same light source pattern. Whether the display modules display the same or different light source patterns is not limited herein.

In addition, adjacent display modules 211 on a position may display different light source patterns $O_i$, thereby increasing the complexity of the light source patterns $O_i$ and improving the security of the apparatus for imaging the fingerprint.

In some embodiment, in order to further increase the complexity of the light source patterns $O_i$ in the light source code O and improve the security of the apparatus for imaging the fingerprint, the display modules 211 sequentially display the plurality of the light source patterns $O_i$ within a preset imaging time period.

Specifically, adjacent display modules 211 in a time sequence display different light source patterns $O_i$, thereby increasing the complexity of the light source patterns $O_i$ and improving the security of the apparatus for imaging the fingerprint.

Specifically, the display modules 211 may sequentially display the plurality of different light source patterns $O_i$ to further increase the complexity of the light source patterns $O_i$, and improve the security of the apparatus for imaging the fingerprint.

In some embodiment, in order to strengthen the influence of the change of the light source pattern $O_i$ on the process of fingerprint imaging, a spatial frequency of the bright-dark alternation of the light source pattern $O_i$ is adapted to a spatial frequency of the fingerprint. That is, in the light source pattern $O_i$ of the light source code O, a length of a period of alternate appearance of a luminous part and a non-luminous part is similar to a length of a period of alternate appearance of peaks and valleys of the fingerprint.

On the other hand, the complexity of the light source pattern $O_i$ itself will affect the complexity of corresponding point spread function, which will affect amount of calculation in the process of capturing fingerprint image. Therefore, as shown in FIG. 5, in some embodiment, in order to achieve both computational efficiency and security, the light source pattern $O_i$ is at least selected from a group including a plus sign shape pattern (a light source pattern $O_+$ as shown in FIG. 5), an X-shaped pattern (a light source pattern $O_X$ as shown in FIG. 5) and a Z-shaped pattern (a light source pattern $O_Z$ shown in FIG. 5). In other embodiments of the present disclosure, the light source pattern can also be selected from a minus sign shape pattern, an M-shaped pattern, an L-shaped pattern and a Y-shaped pattern, which is not limited by the present disclosure.

Referring to FIG. 4, the fingerprint imaging device further includes a sensing surface 220. The sensing surface 220 is used to provide a surface to be contacted or pressed by a finger.

In some embodiment, the apparatus for imaging the fingerprint is an under-screen fingerprint imaging apparatus using an OLED display screen, and the sensing surface 220 is a surface of a cover glass of the OLED display screen. The finger contacts with the surface of the cover glass to capture the fingerprint image.

Specifically, after the finger is placed on the cover glass, the light generated by the light source 210 is projected onto the sensing surface 220, and reflected and refracted on the sensing surface 220 to form signal light 223 with fingerprint information.

The imaging module 230 images the signal light to obtain an initial fingerprint image. Specifically, the imaging module 230 collects the signal light 223 for imaging and photoelectric conversion to obtain the initial fingerprint image.

In some embodiment, the imaging module 230 may be a photoelectric sensor. The photoelectric sensor includes a photosensitive pixel array, and each pixel includes a photodiode or a phototransistor.

In some embodiment, the imaging module 230 may include a TFT circuit area and a light detecting thin film transistor area, and the light detecting thin film transistor area is provided with a photosensitive thin film transistor.

In an optical system, a point Spread Function (PSF) describes a response of an imaging system to a point light source. Therefore, a result of a convolution of the point spread function with the fingerprint image is an imaging result of the signal light, that is, the initial fingerprint image, which can be expressed as:

$$y=h(o)*x$$

wherein y represents the initial fingerprint image, x represents the fingerprint image, h(o) represents the point spread function, and o represents the light source pattern.

In some embodiment, the light source code O includes a plurality of light source patterns $O_i$. The light source 210 includes a plurality of display modules 211, and the plurality of display modules 211 display the plurality of light source patterns $O_i$ respectively. Each light source pattern $O_i$ can obtain a corresponding initial fingerprint image, so a result of a convolution of each light source pattern $O_i$ with the fingerprint image is the initial fingerprint image corresponding to the light source pattern $O_i$, which can be expressed as:

$$y_i=h(o_i)*x$$

wherein $O_i$ represents the light source pattern, x represents the fingerprint image, $h(o_i)$ represents the point spread function corresponding to the light source pattern $O_i$, $y_i$ represents the obtained initial fingerprint image corresponding to the light source pattern $O_i$.

The imaging module 230 images the signal light, thus a superposition of the initial fingerprint images obtained by all light source patterns $O_i$ is the initial fingerprint image obtained by the imaging module 230, which can be expressed as:

$$Y = \sum_{i}^{N} m_i[h(o_i)*x]$$

wherein h(O) represents the point spread function corresponding to the light source code, x represents the fingerprint image, $O_i$ represents the light source pattern, $h(o_i)$ represents the point spread function corresponding to the light source pattern $O_i$, $m_i$ represents a weight of the light source pattern $O_i$ in the light source code O, and Y represents the initial fingerprint image obtained by the imaging module 230.

Specifically, the point spread function of the light source code O is obtained according to the linear combination of the point spread functions corresponding to the light source patterns $O_i$, so the fingerprint image obtained by the imaging module 230 can be expressed as:

$$Y = h(O) * x = h\left(\sum_{i}^{N} m_i o_i\right) * x$$

wherein h(O) represents the point spread function corresponding to the light source code, x represents the fingerprint image, $O_i$ represents the light source pattern, $h(o_i)$ represents the point spread function corresponding to the light source pattern $O_i$, $m_i$ represents the weight of the light source pattern $O_i$ in the light source code O, and Y represents the initial fingerprint image obtained by the imaging module 230.

Referring to FIG. 4, the apparatus for imaging the fingerprint further includes a processing module 240. The processing module 240 can obtain a processed fingerprint image based on the light source code O and the initial fingerprint image.

It should be noted that the light source code O may be pre-stored in the processing module 240 to control the light source 210 to display multiple light source patterns $O_i$.

In some embodiment, the processing module 240 is coupled with the imaging module 230 to obtain the initial fingerprint image from the imaging module 230. The processing module 240 may be pre-stored with the light source code O. The processing module 240 can obtain the processed fingerprint image according to the light source code O and the initial fingerprint image.

Figure 6:
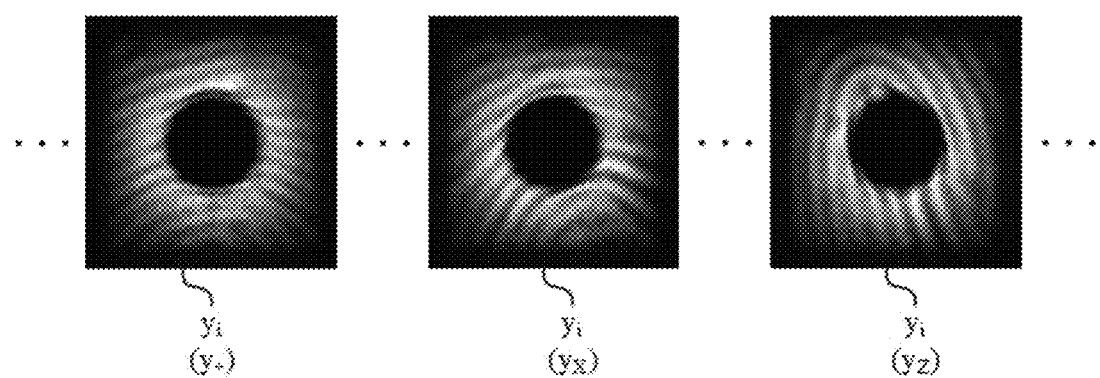
FIG. 6 is a schematic diagram showing an initial fingerprint image $y_i$ corresponding to a light source pattern $O_i$ in the apparatus for fingerprint imaging shown in FIG. 5.

Referring to FIG. 6, initial fingerprint images $y_i$ corresponding to the light source patterns $O_i$ in the apparatus for imaging the fingerprint according to some embodiment as shown in FIG. 5 are shown.

As shown in FIG. 6, an initial fingerprint image $y_+$ corresponds to the light source pattern $O_+$ shown in FIG. 5, an initial fingerprint image $y_X$ corresponds to the light source pattern $O_X$ shown in FIG. 5, and an initial fingerprint image $y_Z$ corresponds to the light source pattern $O_Z$ shown in FIG. 5. It can be seen that the point spread functions corresponding to different light source patterns $O_i$ are different, so the initial fingerprint images $y_i$ obtained by imaging are different, thus an accurate and clear fingerprint image can be obtained by only obtaining the point spread functions corresponding to the light source patterns $O_i$.

Therefore, on the basis of the light source code O and the initial fingerprint image, the processing module 240 can obtain a clear and accurate fingerprint image. Moreover, only the processing module 240 pre-stored with the light source code O can obtain the clear and accurate fingerprint image. Thus, the process of obtaining the fingerprint image by the apparatus for imaging the fingerprint is encrypted by the light source code, thereby enhancing the security of the apparatus for imaging the fingerprint.

Figure 7:
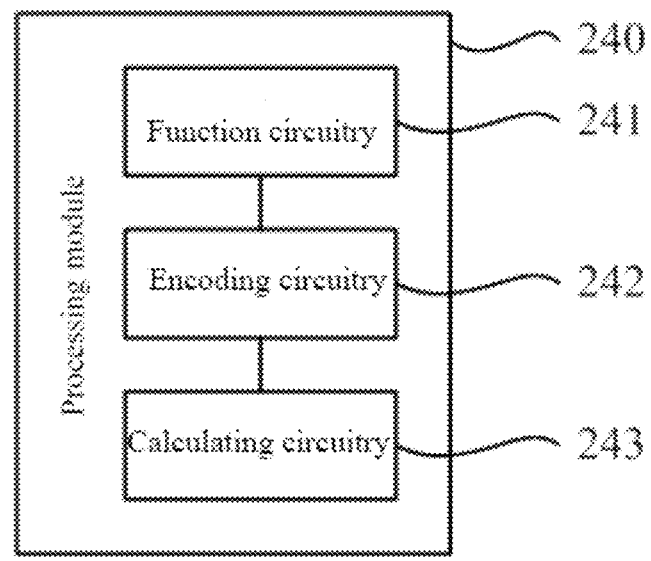
FIG. 7 is a functional block diagram of a processing module 140 in the apparatus for fingerprint imaging shown in FIG. 4.

Referring to FIG. 7, a functional block diagram of the processing module 240 in the apparatus for imaging the fingerprint shown in FIG. 4 is shown.

In some embodiment, the processing module 240 may include a function circuitry 241, an encoding circuitry 242 and a calculating circuitry 243. The function circuitry 241 is configured to obtain a point spread function corresponding to the light source pattern $O_i$ according to the light source pattern $O_i$. The encoding circuitry 242 is configured to obtain a point spread function corresponding to the light source code O based on the point spread function corresponding to the light source pattern $O_i$. The calculating circuitry 243 is configured to obtain the processed fingerprint image according to the point spread function corresponding to the light source code O and the initial fingerprint image.

Specifically, the function circuitry 241 is pre-stored with the light source code O including the plurality of the light source patterns $O_i$. The function circuitry 241 can obtain the point spread function corresponding to the light source pattern $O_i$ according to the light source pattern $O_i$.

The encoding circuitry 242 is coupled with the function circuitry 241, and can obtain the point spread function corresponding to the light source pattern $O_i$ from the function circuitry 241. The encoding circuitry 242 can obtain the point spread function corresponding to the light source code O based on the point spread function corresponding to the light source pattern $O_i$.

Specifically, the encoding circuitry 242 can obtain the point spread function corresponding to the light source code O based on a linear combination of point spread functions corresponding to light source patterns $O_i$.

The calculating circuitry 243 is coupled with the encoding circuitry 242, and obtains the point spread function corresponding to the light source code O from the encoding circuitry. The calculating circuitry 243 is coupled with the imaging module 230, and obtains the initial fingerprint image from the imaging module 230. The calculating circuitry 243 obtains the processed fingerprint image according to the point spread function corresponding to the light source code O and the initial fingerprint image.

Specifically, the calculating circuitry 243 can obtain the processed fingerprint image through a blind deconvolution calculation on the basis of the initial fingerprint image obtained by the imaging module 230 and the point spread function corresponding to the light source code O. Specifically, the calculating circuitry 243 performs the blind deconvolution calculation by the method of Eddy's description.

Accordingly, another embodiment of the present disclosure provides a method for imaging a fingerprint. The method includes: generating light with a light intensity distribution conforming to a preset encoding mode; forming signal light with fingerprint information by the generated light on a sensing surface; and imaging the signal light.

Figure 8:
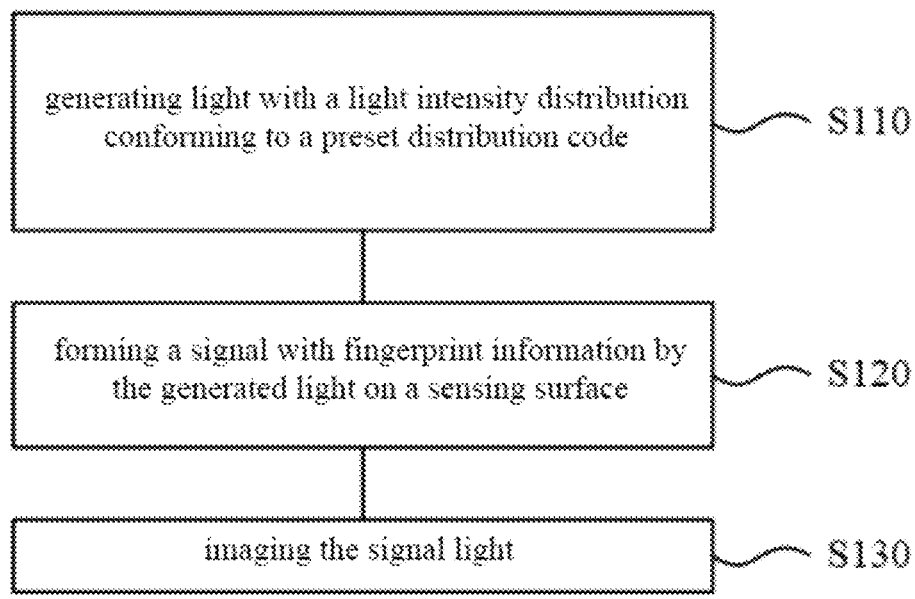
FIG. 8 is a flow chart of a method for fingerprint imaging according to an embodiment of the present disclosure.

Referring to FIG. 8, a flow chart of the method for imaging a fingerprint according to an embodiment of the present disclosure is shown.

First, S110 is executed to generate light, and the light intensity distribution of the generated light conforms to a preset distribution code L. The distribution code L includes at least one distribution pattern $l_i(\theta)$.

Referring to FIG. 1, a structural diagram of the apparatus for imaging the fingerprint used in the method for imaging the fingerprint shown in FIG. 8 is shown.

The apparatus for imaging the fingerprint includes a light source 110. The light source 110 is configured to generate light with the light intensity distribution having the preset distribution code L. The distribution mode L includes at least one distribution pattern $l_i(\theta)$. In some embodiment of the present disclosure, the distribution code L includes a plurality of distribution patterns $l_i(\theta)$. In the process of generating light, the generated light has one or more distribution patterns.

Specifically, the light source 110 includes a plurality of display modules 111, and each of the plurality of display modules 111 generates light with the light intensity distribution having a distribution pattern. That is, each display module 111 generates light having an independent distribution pattern, that is, the light intensity distribution of the light generated by each display module 111 conforms to a distribution pattern $l_i(\theta)$. The light intensity distributions of the light generated by all the display modules 111 constitute the distribution code L.

It should be noted that in some embodiment of the present disclosure, the method for imaging the fingerprint may be applied to an under-screen fingerprint imaging apparatus. Specifically, in the step of generating light, an OLED display screen may be used to generate light. When the method for imaging the fingerprint is applied to the under-screen fingerprint imaging apparatus using the OLED display screen, it can not only ensure a larger screen proportion, but also realize the fingerprint imaging function, which can effectively improve the user experience.

With reference to FIG. 2, an optical structure of the apparatus for imaging the fingerprint is shown.

In the step of generating light, the light exits at a certain emergent angle $\theta$. Since the light source 110 includes the OLED display screen, the range of the emergent angle $\theta$ of the light generated by the light source 110 is wider, and the wider the range of the emergent angle $\theta$ of the generated light, the better.

As shown in FIG. 2, among the light generated by the light source 110, light having a small emergent angle $\theta$, for example, light 11 or light 12 as shown in FIG. 2, is projected onto the sensing surface 120, and most of the light is emitted from the sensing surface 120, and seldom reflected, thus the fingerprint image cannot be obtained. Only the light having an emergent angle $\theta$ greater than an angle of total reflection $\theta_c$ can be used to obtain the fingerprint image. The angle of total reflection $\theta_c$ is related to an optical refractive index of a material of both sides of the sensing surface. At an interface between glass and air, a typical angle of total reflection $\theta_c$ may be 42 degrees.

On the other hand, the light having a large emergent angle $\theta$, for example, light 13 as shown in FIG. 1, is projected on the sensing surface 120 and the reflected light will cause interference to the imaging of the imaging module 130 (for example, the light 13 may form an optical waveguide), which will become noise and affect the signal-to-noise ratio, thus causing the problem that the obtained fingerprint image is not clear enough.

In some embodiment of the present disclosure, in the step of generating light, at least the light intensity distribution of the light having an emergent angle within a range from 40 degrees to 60 degrees conforms to the distribution code, which can not only ensure a smooth collection of fingerprint images, but also suppress noises, and obtain a higher signal-to-noise ratio. Moreover, when the light source is an OLED display screen, a large viewing angle can also be obtained, thereby further improving the use experience.

Furthermore, the apparatus for imaging the fingerprint may be an under-screen fingerprint imaging apparatus, that is, the imaging module 130 of the apparatus for imaging the fingerprint is disposed directly below the OLED display screen. By configuring the apparatus for imaging the fingerprint as the under-screen fingerprint imaging apparatus, it is possible to further increase the screen proportion and effectively improve the use experience.

In some embodiments, the light source 110 includes a plurality of discrete display modules 111. The plurality of discrete display modules 111 may have the same or different intervals, and the plurality of discrete display modules 111 may be a plurality of display areas in the light source 110.

In some embodiment of the present disclosure, in the step of generating light, the generated light has different distribution patterns $l_i(\theta)$, thereby effectively increasing the complexity of the distribution code L and the complexity of the distribution patterns $l_i(\theta)$ in the distribution code L, and thereby improving the security of fingerprint imaging.

It should be noted that in other embodiments of the present disclosure, in the step of generating light, the generated light may have a same distribution pattern $l_i(\theta)$ simultaneously. In other embodiments of the present disclosure, in the step of generating light, some of the generated light may have a same distribution pattern $l_i(\theta)$. Whether the display modules simultaneously generate light having the same or different distribution patterns $l_i(\theta)$ is not limited herein.

In some embodiment of the present disclosure, in the step of generating light, distribution patterns $l_i(\theta)$ of adjacent light on a position are not the same, thereby increasing the complexity of the distribution patterns $l_i(\theta)$ and improving the security of the apparatus for imaging the fingerprint.

In some embodiment of the present disclosure, in order to further increase the complexity of the distribution patterns $l_i(\theta)$ in the distribution code L, in the step of generating light, the light having multiple distribution patterns $l_i(\theta)$ is generated sequentially within a preset imaging time period. That is to say, as shown in FIG. 1, the same display module 111 can generate light having multiple distribution patterns $l_i(\theta)$ sequentially.

Specifically, the light is generated sequentially in multiple different distribution patterns $l_i(\theta)$, which can further increase the complexity of the distribution patterns $l_i(\theta)$, so as to improve the security of the apparatus for imaging the fingerprint.

In some embodiment of the present disclosure, the light generated sequentially in adjacent time sequence have multiple different distribution patterns $l_i(\theta)$, which can further increase the complexity of the distribution patterns $l_i(\theta)$, so as to improve the security of the apparatus for imaging the fingerprint.

On the other hand, the complexity of the distribution patterns $l_i(\theta)$ will affect the complexity of corresponding point spread functions, which will affect amount of calculation in the process of capturing fingerprint image. Therefore, as shown in FIG. 2, in some embodiment of the present disclosure, in order to achieve computational efficiency and safety, the distribution patterns $l_i(\theta)$ are at least selected from a group including Lambertian distribution, Batwing distribution and Side-light emitting distribution. In other embodiments of the present disclosure, the distribution patterns $l_i(\theta)$ are related to a design of the light source, and can also be selected from other light intensity distribution patterns. The present disclosure is not limited to this.

Next, S120 is executed, and the generated light forms the signal light carrying fingerprint information on the sensing surface 120.

Specifically, the sensing surface 120 is used to provide a surface to be contacted by a finger. In some embodiment of the present disclosure, the method for imaging the fingerprint is applied to the under-screen fingerprint imaging apparatus using the OLED display screen, so the sensing surface 120 is the surface of a cover glass of the OLED display screen.

Then, S130 is executed to image the signal light.

Specifically, imaging the signal light may include imaging the signal light to obtain an initial fingerprint image. Referring to FIG. 1, in some embodiment of the present disclosure, the imaging module 130 collects the signal light for imaging and photoelectric conversion, and then obtains the initial fingerprint image.

In some embodiment, the imaging module 130 may be a photosensor. The photosensor includes a photosensitive pixel array, and each pixel includes a photodiode or a phototransistor. In some embodiment, the imaging module 130 may include a TFT circuit area and a light detecting thin film transistor area. The light detecting thin film transistor area is provided with a photosensitive thin film transistor.

In an optical system, a point spread function (PSF) describes a response of an imaging system to a point light source. Therefore, a result of a convolution of the point spread function with the fingerprint image is an imaging result of the signal light, that is, the initial fingerprint image, which can be expressed as:

$$y = h * x + n$$

wherein y represents the initial fingerprint image, h represents the point spread function, x represents the fingerprint image, and n represents noise.

In some embodiment, the distribution code L includes a plurality of distribution patterns $l_i(\theta)$. In the step of generating light, the generated light has one or more distribution patterns $l_i(\theta)$. Each distribution pattern $l_i(\theta)$ can obtain a corresponding initial fingerprint image, so a convolution result of each distribution pattern $l_i(\theta)$ with the fingerprint image is the corresponding initial fingerprint image corresponding to the distribution pattern $l_i(\theta)$, which can be expressed as:

$$y_i = h[l_i(\theta)] * x + n$$

wherein $y_i$ represents the obtained initial fingerprint image corresponding to the distribution pattern $l_i(\theta)$, $h[l_i(\theta)]$ represents the point spread function corresponding to the distribution pattern $l_i(\theta)$, $l_i(\theta)$ represents the distribution pattern, x represents the fingerprint image, and n represents the noise.

In some embodiment of the present disclosure, a superposition of initial fingerprint images obtained by all distribution patterns $l_i(\theta)$ is the initial fingerprint image obtained by the imaging module 130, which can be expressed as:

$$Y = \sum_i^N m_i \{h[l_i(\theta)] * x\} + n$$

wherein Y represents the initial fingerprint image obtained by the imaging module 130, represents a weight of the distribution pattern $l_i(\theta)$ in the distribution code L, $h[l_i(\theta)]$ represents the point spread function corresponding to the distribution pattern $l_i(\theta)$, $l_i(\theta)$ represents the distribution pattern, x represents the fingerprint image, and n represents the noise.

Specifically, the point spread function of the distribution code L is obtained according to a linear combination of the point spread functions corresponding to the distribution patterns $l_i(\theta)$, so the initial fingerprint image obtained by the imaging module 130 can be expressed as:

$$Y = h(L) * x = h \left[ \sum_i^N m_i l_i(\theta) \right] * x + n$$

wherein h(L) represents the point spread function corresponding to the distribution code L, x represents the fingerprint image, $l_i(\theta)$ represents the distribution pattern, represents the weight of the distribution pattern in the distribution code L, and Y represents the initial fingerprint image obtained by the imaging module 130, and n represents the noise.

Therefore, after imaging the signal light to obtain the initial fingerprint image, the method further includes: obtaining a processed fingerprint image based on the distribution code L and the initial fingerprint image.

It should be noted that in some embodiment of the disclosure, before generating light, the method also includes: pre-storing the distribution code L for generating the light. Specifically, referring to FIG. 1, the distribution code L is pre-stored to control the light source 110 to generate light with the distribution code L having at least one distribution pattern $l_i(\theta)$.

Specifically, obtaining a processed fingerprint image includes: obtaining a point spread function corresponding to the distribution pattern $l_i(\theta)$ according to the distribution pattern $l_i(\theta)$; obtaining a point spread function corresponding to the distribution code based on the point spread function corresponding to the distribution pattern $l_i(\theta)$; and obtaining the processed fingerprint image according to the point spread function corresponding to the distribution code and the initial fingerprint image.

In some embodiment of the present disclosure, obtaining the point spread function corresponding to the distribution code L includes obtaining the point spread function corresponding to the distribution code L based on a linear combination of point spread functions corresponding to distribution patterns $l_i(\theta)$.

In addition, as mentioned above, a final fingerprint image is obtained by the convolution calculation. Therefore, based on the final fingerprint image and the point spread function corresponding to the distribution code L, the fingerprint image can be obtained by a blind deconvolution calculation. Specifically, the blind deconvolution calculation may be performed by the method of Eddy's description.

Figure 9:
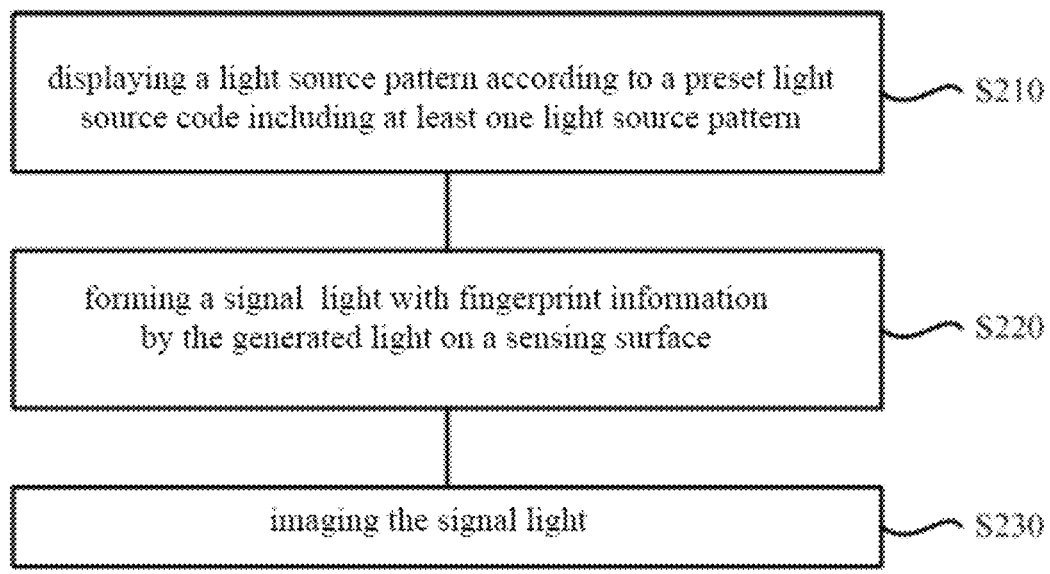
FIG. 9 schematically illustrates a flow chart of a method for fingerprint imaging according to another embodiment of the present disclosure.

Referring to FIG. 9, a flow chart of a method for imaging a fingerprint according to another embodiment of the present disclosure is shown.

It should be noted that the difference between this embodiment and the previous embodiment is that in this embodiment, the encoding mode includes a light source code. The light source code includes at least one light source pattern.

First, S210 is executed to generate light by displaying the light source pattern according to a preset light source code O. The light source code O includes at least one light source pattern $O_i$.

In some embodiment, the light source code O includes multiple light source patterns $O_i$. In the step of displaying the light source pattern $O_i$ according to the preset light source code O, multiple light source patterns $O_i$ are displayed at the same time. Specifically, in the step of displaying the light source pattern $O_i$ according to the preset light source code O, multiple different light source patterns $O_i$ are displayed at the same time.

Referring to FIG. 4, a structure of an apparatus for imaging the fingerprint used in the method for imaging the fingerprint shown in FIG. 9 is shown.

The apparatus for imaging the fingerprint includes a light source 210. The light source 210 is adapted to display the light source code O to generate light. The light source 210 includes a plurality of display modules 211. The plurality of display modules 211 can display the light source pattern $O_i$ at the same time, that is, each display module 211 can display one light source pattern $O_i$ independently. In other words, each display module displays one light source pattern $O_i$, and the light source patterns $O_i$ displayed by all display modules constitute the light source code O of the apparatus for imaging the fingerprint.

In some embodiment, the light source 210 includes a plurality of discrete display modules 211. The plurality of discrete display modules 211 may have the same or different intervals, and the plurality of discrete display modules 211 may be a plurality of display areas in the light source 210.

It should be noted that in other embodiments of the present disclosure, the plurality of display modules may also display the same light source pattern at the same time. In other embodiments of the present disclosure, some of the plurality of display module may display the same light source pattern. Whether the display modules display the same or different light source patterns is not limited herein.

It should be noted that in some embodiment, the method for imaging the fingerprint is applied to an under-screen fingerprint imaging apparatus. Specifically, an OLED display screen is used to display the light source code O to generate light, that is to say, the light source 111 includes the OLED display screen. When the method for imaging the fingerprint is applied to the under-screen fingerprint imaging apparatus using the OLED display screen, it can not only ensure a larger screen proportion, but also realize the fingerprint imaging function, which can effectively improve the user experience.

In some embodiment, in the step of displaying the light source pattern $O_i$ according to the preset light source code O, multiple different light source patterns $O_i$ are displayed at the same time, so that the complexity of the light source code O can be effectively increased, and the complexity of the point spread function required in the process of obtaining the fingerprint image can be effectively increased, thus the security of the method for imaging the fingerprint can be effectively improved. Specifically, the plurality of display modules 211 display different light source patterns $O_i$ respectively.

In addition, in the step of displaying the light source pattern $O_i$ according to the preset light source code O, the light source patterns $O_i$ at adjacent positions are different. Specifically, adjacent display modules 211 display different light source patterns $O_i$, thereby increasing the complexity of the light source patterns $O_i$ and improving the security of the apparatus for imaging the fingerprint.

In some embodiment, in order to further increase the complexity of the light source patterns $O_i$ in the light source code O, the display modules 211 sequentially display the plurality of the light source patterns $O_i$ within an imaging time period.

In some embodiment, a plurality of different light source patterns $O_i$ are sequentially displayed within the imaging time period, so as to further increase the complexity of the light source patterns $O_i$ and improve the safety of the apparatus for imaging the fingerprint Specifically, in the imaging time period, the display modules 211 sequentially display the plurality of different light source patterns $O_i$, that is to say, adjacent display modules 211 in time sequence display different light source patterns $O_i$, which increases the complexity of the light source pattern $O_i$ and improves the security of the apparatus for imaging the fingerprint.

In some embodiment, in order to strengthen the influence of the change of the light source pattern $O_i$ on the process of fingerprint imaging, a spatial frequency of the bright-dark alternation of the light source pattern $O_i$ is adapted to a spatial frequency of the fingerprint. That is, in the light source pattern $O_i$ of the light source code O, a length of a period of alternate appearance of a luminous part and a non-luminous part is similar to a length of a period of alternate appearance of peaks and valleys of the fingerprint.

On the other hand, the complexity of the light source pattern $O_i$ itself will affect the complexity of corresponding point spread function, which will affect amount of calculation in the process of capturing fingerprint image. Therefore, as shown in FIG. 5, in some embodiment, in order to achieve both computational efficiency and security, the light source pattern $O_i$ is at least selected from a group including a plus sign shape pattern (a light source pattern $O_+$ as shown in FIG. 5), an X-shaped pattern (a light source pattern $O_X$ as shown in FIG. 5) and a Z-shaped pattern (a light source pattern $O_Z$ shown in FIG. 5). In other embodiments of the present disclosure, the light source pattern can also be selected from a minus sign shape pattern, an M-shaped pattern, an L-shaped pattern and a Y-shaped pattern, which is not limited by the present disclosure.

Referring to FIG. 9, S220 is executed, and the generated light forms the signal light with fingerprint information on the sensing surface.

With reference to FIG. 4, in some embodiment, the apparatus for imaging the fingerprint is an under-screen fingerprint imaging apparatus using an OLED display screen, and the sensing surface 220 is a surface of a cover glass of the OLED display screen. The finger contacts with the surface of the cover glass to capture the fingerprint image.

Specifically, after the finger is placed on the cover glass, the light generated by the light source 210 is projected onto the sensing surface 220, and reflected and refracted on the sensing surface 220 to forming signal light 223 with fingerprint information.

Referring to FIG. 9, next, S230 is executed to image the signal light.

Specifically, imaging the signal light includes imaging the signal light to obtain an initial fingerprint image. Referring to FIG. 4, in some embodiment, the imaging module 230 collects the signal light 223 for imaging and photoelectric conversion to obtain the initial fingerprint image.

In some embodiment, the imaging module 230 may be a photoelectric sensor. The photoelectric sensor includes a photosensitive pixel array, and each pixel includes a photodiode or a phototransistor.

In some embodiment, the imaging module 230 may include a TFT circuit area and a light detecting thin film transistor area, and the light detecting thin film transistor area is provided with a photosensitive thin film transistor.

In an optical system, a point spread function (PSF) describes a response of an imaging system to a point light source. Therefore, a result of a convolution of the point spread function with the fingerprint image is an imaging result of the signal light, that is, the initial fingerprint image, which can be expressed as:

$$y=h(o)*x$$

wherein y represents the initial fingerprint image, x represents the fingerprint image, h(o) represents the point spread function, and o represents the light source pattern.

In some embodiment, the light source code O includes a plurality of light source patterns $O_i$. The light source 210 includes a plurality of display modules 211, and the plurality of display modules 211 display the plurality of light source patterns $O_i$ respectively. Each light source pattern $O_i$ can obtain a corresponding initial fingerprint image, so a result of a convolution of each light source pattern $O_i$ with the fingerprint image is the initial fingerprint image corresponding to the light source pattern $O_i$, which can be expressed as:

$$y_i = h(o_i) * x$$

wherein $O_i$ represents the light source pattern, x represents the fingerprint image, $h(o_i)$ represents the point spread function corresponding to the light source pattern $O_i$, $y_i$ represents the obtained initial fingerprint image corresponding to the light source pattern $O_i$.

A final fingerprint image is obtained by imaging the signal light, thus a superposition of initial fingerprint images obtained by all light source patterns $O_i$ is the final fingerprint image, which can be expressed as:

$$Y = \sum_i^N m_i [h(o_i) * x]$$

wherein h(O) represents the point spread function corresponding to the light source code, x represents the fingerprint image, $O_i$ represents the light source pattern, $h(o_i)$ represents the point spread function corresponding to the light source pattern $O_i$, $m_i$ represents a weight of the light source pattern $O_i$ in the light source code O, and Y represents the final fingerprint image obtained by the imaging module 230.

Specifically, the point spread function of the light source code O is obtained according to the linear combination of the point spread function corresponding to the light source patterns $O_i$, thus the final fingerprint image can be expressed as:

$$Y = h(O) * x = h\left(\sum_i^N m_i o_i\right) * x$$

wherein h(O) represents the point spread function corresponding to the light source code, x represents the fingerprint image, $O_i$ represents the light source pattern, $h(o_i)$ represents the point spread function corresponding to the light source pattern $O_i$, $m_i$ represents the weight of the light source pattern $O_i$ in the light source code O, and Y represents the final fingerprint image.

Therefore, after imaging the signal light to obtain the initial fingerprint image, the method also includes: obtaining a processed fingerprint image based on the light source code O and the initial fingerprint image.

It should be noted that in some embodiment, before the step of displaying the light source code O to generate light, the method for imaging the fingerprint also includes: pre-storing the light source code O for display. Specifically, combining with FIG. 4, the light source code O are pre-stored for controlling the light source 210 to display the plurality of light source patterns $O_i$.

Referring to FIG. 6, initial fingerprint images $y_i$ corresponding to the plurality of light source patterns $O_i$ in the method for imaging the fingerprint as shown in FIG. 9 are shown.

As shown in FIG. 6, an initial fingerprint image $y_+$ corresponds to the light source pattern $O_+$ shown in FIG. 5, an initial fingerprint image $y_X$ corresponds to the light source pattern $O_X$ shown in FIG. 5, and an initial fingerprint image $y_Z$ corresponds to the light source pattern $O_Z$ shown in FIG. 5. It can be seen that the point spread functions corresponding to different light source patterns $O_i$ are different, so the initial fingerprint images $y_i$ obtained by imaging are different, thus an accurate and clear fingerprint image can be obtained by only obtaining the point spread functions corresponding to the light source patterns $O_i$.

Therefore, in the step of obtaining the processed fingerprint image, a clear and accurate fingerprint image can be obtained on the basis of obtaining the light source code O and the initial fingerprint image. Moreover, only on the basis of obtaining the light source code O, the clear and accurate fingerprint image can be obtained. It can be seen that the process of obtaining the fingerprint image in the method for imaging the fingerprint is encrypted by the light source code O, thus the method for imaging the fingerprint has higher security.

Specifically, obtaining the processed fingerprint image may include: obtaining a point spread function corresponding to the light source pattern $O_i$ according to the light source pattern $O_i$, obtaining a point spread function corresponding to the light source code O based on the point spread function corresponding to the light source pattern $O_i$, and obtaining the processed fingerprint image according to the point spread function corresponding to the light source code O and the initial fingerprint image.

In some embodiment of the present disclosure, obtaining a point spread function corresponding to the light source code O includes obtaining the point spread function corresponding to the light source code O based on a linear combination of point spread functions corresponding to light source patterns $O_i$.

In addition, as mentioned above, the final fingerprint image is obtained by the convolution calculation. Therefore, based on the final fingerprint image and the point spread function corresponding to the light source code O, the fingerprint image can be obtained by the blind deconvolution calculation. Specifically, the blind deconvolution calculation may be performed by the method of Eddy's description.

It should be noted that the relational terms herein such as first and second are used only to differentiate an entity or operation from another entity or operation, and do not require or imply any actual relationship or sequence between these entities or operations. In addition, term "comprise", "include", or any other variant thereof aims to cover non-exclusive "include", so that a process, method, object, or terminal device that comprises a series of elements not only comprises the elements, but also comprises other elements that are not definitely listed, or further comprises inherent elements of the process, method, object, or terminal device. In a case in which there are no more limitations, an element defined by the sentence "comprise . . . " or "include . . . " does not exclude the case in which other elements further exist in a process, method, or object, or terminal device that comprises the element. In addition, in this text, "greater than", "less than", "exceed", and the like are understood as not including the number. "More", "fewer", "within", and the like are understood as including the number.

A person skilled in the art should understand that the foregoing embodiments may provide a method, an apparatus, a device, or a computer program product. These embodiments may use forms of full hardware embodiments, full software embodiments, or embodiments of a combination of software and hardware aspects. All or some of the steps in the methods involved in the foregoing embodiments may be implemented by using a program instructing relevant hardware. The program may be stored in a computer device readable storage medium for performing all or some of the steps of the methods in the foregoing embodiments. The computer device includes but is not limited to: a personal computer, a server, a general-purpose computer, a dedicated computer, a network device, an embedded device, a programmable device, an intelligent mobile terminal, an intelligent home device, a wearable intelligent device, an in-vehicle intelligent device, and the like. The storage medium includes but is not limited to: a RAM, a ROM, a magnetic disk, a magnetic tape, an optical disc, a flash memory, a USB flash drive, a removable hard disk, a memory card, a memory stick, network server storage, network cloud storage, and the like.

Various logical modules and circuits described with reference to the embodiments disclosed with reference to this specification may be implemented or executed by using a general purpose processor, a digital signal processor (DSP), an application-specific integrated circuit (ASIC), a field-programmable gate array (FPGA) or another programmable logical component, a discrete gate or transistor logic, a discrete hardware component, or any combination designed to implement functions described in this specification. The general purpose processor may be a micro processor. However, in an alternative solution, the processor may be any conventional processor, controller, micro controller, or state machine. The processor may be any conventional processor, controller, micro controller, or state machine. The processor may be any conventional processor, controller, micro controller, or state machine. The processor may be alternatively implemented as a combination of computing devices, for example, a combination of a DSP and micro processor, multiple micro processors, one or more micro processor coordinated with a core of a DSP, or any other such configuration.

Steps of the method or algorithm described with reference to the embodiments disclosed in this specification may be directly reflected in hardware, a software module executed by the processor, or a combination of the two. The software module may reside in a RAM memory, a flash memory, a ROM memory, an EPROM memory, an EEPROM memory, a register, a hard disk, a removable disk, a CD-ROM, or a storage medium in any other form known in the art. Exemplarily, the storage medium is coupled to the processor, so that the processor can read information from and write information into the storage medium. In an alternative solution, the storage medium may be integrated into the processor. The processor and the storage medium may reside in the ASIC. The ASIC may reside in a user terminal. In an alternative solution, the processor and the storage medium may reside in the user terminal as discrete components.

The foregoing embodiments are described with reference to flowcharts and/or block diagrams of the method, the device (the system), and the computer program product in the embodiments. It should be understood that computer program instructions may be used for implementing each process and/or each block in the flowcharts and/or the block diagrams and a combination of a process and/or a block in the flowcharts and/or the block diagrams. These computer program instructions may be provided to a computer of a computer device to generate a machine, so that instructions executed by the processor of the computer device generate an apparatus configured to implement specific functions in one or more processes in the flowcharts and/or in one or more blocks in the block diagrams.

These computer program instructions may further be stored in a computer device readable memory that can instruct the computer device to work in a specific manner, so that the instructions stored in the computer device readable memory generate an artifact that includes an instruction apparatus. The instruction apparatus implements specific functions in one or more processes in the flowcharts and/or in one or more blocks in the block diagrams.

These computer program instructions may further be loaded onto a computer device, so that a series of operations and steps are performed on the computer device, thereby generating computer-implemented processing. Therefore, the instructions executed on the computer device provide steps for implementing specific functions in one or more processes in the flowcharts and/or in one or more blocks in the block diagrams.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. An apparatus for imaging a fingerprint, comprising:
   a light source configured to generate light, wherein a light intensity distribution of the light generated by the light source conforms to a preset encoding mode;
   a sensing surface on which the light generated by the light source forms a signal light with fingerprint information; and
   an imaging module configured to image the signal light to obtain a fingerprint image;
   wherein the preset encoding mode comprises a distribution code or a light source code, wherein the distribution code comprises at least one distribution pattern, and the light source code comprises at least one light source pattern;
   wherein among the light generated by the light source, at least the light having an emergent angle within a range from 40 degrees to 60 degrees has a light intensity distribution conforming to the distribution code.

2. The apparatus according to claim 1, wherein the light source comprises a plurality of display modules, and each of the plurality of display modules is configured to generate light with a light intensity distribution having a distribution pattern.

3. The apparatus according to claim 2, wherein the plurality of display modules are configured to generate light having different distribution patterns simultaneously; or
   adjacent display modules are configured to generate light having different distribution patterns.

4. The apparatus according to claim 1, wherein the light source comprises one or more display modules, and each of the one or more display modules is configured to sequentially generate light having a plurality of distribution patterns within a preset imaging time period.

5. The apparatus according to claim 1, wherein the distribution pattern is at least selected from a group comprising Lambertian distribution, Batwing distribution and Side-light emitting distribution, and the light source pattern is at least selected from a group comprising a plus sign shape pattern, a minus sign shape pattern, an X-shaped pattern, a Z-shaped pattern, an M-shaped pattern, an L-shaped pattern and a Y-shaped pattern.

6. The apparatus according to claim 1, wherein the imaging module is configured to image the signal light to obtain an initial fingerprint image, and the apparatus further comprises a processing module configured to obtain a processed fingerprint image based on the encoding mode and the initial fingerprint image.

7. The apparatus according to claim 6, wherein the processing module comprises a function circuitry, an encoding circuitry, and a calculating circuitry; and
  wherein the function circuitry is configured to obtain a point spread function corresponding to the distribution pattern according to the distribution pattern, the encoding circuitry is configured to obtain a point spread function corresponding to the distribution code based on the point spread function corresponding to the distribution pattern, and the calculating circuitry is configured to obtain the processed fingerprint image according to the point spread function corresponding to the distribution code and the initial fingerprint image; or
  the function circuitry is configured to obtain a point spread function corresponding to the light source pattern according to the light source pattern, and the encoding circuitry is configured to obtain a point spread function corresponding to the light source code based on the point spread function corresponding to the light source pattern, and the calculating circuitry is configured to obtain the processed fingerprint image according to the point spread function corresponding to the light source code and the initial fingerprint image.

8. The apparatus according to claim 7, wherein the encoding circuitry obtaining the point spread function corresponding to the distribution code based on the point spread function corresponding to the distribution pattern comprises: the encoding circuitry obtaining the point spread function corresponding to the distribution code based on a linear combination of point spread functions corresponding to distribution patterns; and
  the encoding circuitry obtaining the point spread function corresponding to the light source code based on the point spread function corresponding to the light source pattern comprises: the encoding circuitry obtaining the point spread function corresponding to the light source code based on a linear combination of point spread functions corresponding to the light source patterns.

9. The apparatus according to claim 1, wherein the light source comprises a plurality of display modules, and the plurality of display modules are configured to simultaneously display the light source pattern.

10. The apparatus according to claim 9, wherein the plurality of display modules are configured to display different light source patterns simultaneously; or,
  adjacent display modules are configured to display different light source patterns.

11. The apparatus according to claim 1, wherein the light source comprises one or more display modules, and each of the one or more display modules is configured to sequentially display a plurality of light source patterns within a preset imaging time period.

12. The apparatus according to claim 1, wherein a spatial period of a bright-dark alternation of the light source pattern corresponds to a spatial period of a ridge-valley alternation of the fingerprint.

13. The apparatus according to claim 6, wherein the processing module is further pre-stored with the light source code to control the light source to display the light source pattern.

14. The apparatus according to claim 1, wherein the light source comprises an OLED display or OLED display pixels.

15. The apparatus according to claim 1, wherein the apparatus comprises an under-screen or in-screen fingerprint imaging apparatus.

16. A method for imaging a fingerprint using the apparatus according to claim 1, comprising:
  driving the light source to generate light, wherein a light intensity distribution of the light generated by the light source conforms to a preset encoding mode, and the light generated by the light source forms a signal light with fingerprint information on the sensing surface; and
  imaging the signal light by the imaging module to obtain a fingerprint image.

* * * * *